(12) United States Patent
Miyasaka et al.

(10) Patent No.: US 7,188,133 B2
(45) Date of Patent: Mar. 6, 2007

(54) FLOATING POINT NUMBER STORAGE METHOD AND FLOATING POINT ARITHMETIC DEVICE

(75) Inventors: Shuji Miyasaka, Neyagawa (JP); Tomokazu Ishikawa, Toyonaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 676 days.

(21) Appl. No.: 10/405,242

(22) Filed: Apr. 3, 2003

(65) Prior Publication Data
US 2003/0236651 A1 Dec. 25, 2003

(30) Foreign Application Priority Data
Jun. 20, 2002 (JP) ............... 2002-180630

(51) Int. Cl.
*G06F 7/487* (2006.01)
(52) U.S. Cl. ............................................. 708/503
(58) Field of Classification Search ............ 708/495, 708/505, 503
See application file for complete search history.

(56) References Cited

U.S. PATENT DOCUMENTS 4,594,679 A * 6/1986 George et al. ............... 708/503
6,990,505 B2 * 1/2006 Ahmed ....................... 708/204
2002/0026468 A1 * 2/2002 Miyasaka et al. ........... 708/606

OTHER PUBLICATIONS

"*The IEEE 754 Standard for Floating Point Arithmetic*", Institute of Electrical and Electronics Engineers, pp. 1-2, Nov. 10, 1999.

* cited by examiner

*Primary Examiner*—D. H. Malzahn
(74) *Attorney, Agent, or Firm*—Wenderoth, Lind & Ponack, L.L.P.

(57) ABSTRACT

In order to provide a method or the like for storing floating point numbers to make it easier to manage the floating point numbers using a fixed point processor, when a real number x is represented by $a*(2^n)$ where a mantissa is a and an exponent is n, the mantissa is stored as a fixed point number in the upper U bits of N-bit field ($N \geq (U+L)$) and the exponent is stored as an integer in the lower L bits. For the multiplication of two real numbers represented in such a format, these two real numbers are multiplied as fixed point numbers so as to make only the upper significant bits of the multiplication result a mantissa, while these two real numbers are added as integers so as to make only the lower significant bits of the addition result an exponent. As a result, the multiplication result can be obtained in a floating point format.

4 Claims, 9 Drawing Sheets

FLOATING POINT NUMBER STORAGE METHOD AND FLOATING POINT ARITHMETIC DEVICE

BACKGROUND OF THE INVENTION (1) Field of the Invention

The present invention relates to a method for storing floating point numbers so as to make it easier to manage the floating point numbers using a fixed point processor, and an arithmetic device for the floating point numbers.

(2) Description of the Prior Art

As a typical example of a conventional format for storing floating point numbers (numbers represented in a floating point format), there is a 32-bit floating point number format in conformity with the IEEE 754 standard. Variables which are declared in a floating point mode in C language conform to this format.

FIG. 1 is a diagram showing a bit field of the 32-bit floating point format in conformity with the IEEE 754 standard. In this figure, the most significant 1 bit is a sign bit storage field 70, which indicates a positive number for 0 and a negative number for 1.

The 8-bit field following the sign bit is called an exponent storage field 71. The 23-bit field following the exponent is called a mantissa storage field 72. When the 8-bit exponent represents a value e of an integer and the 23-bit mantissa represents a value k of a fixed point number (a number represented in a fixed point format) with its binary point being placed immediately to the left of the most significant bit (MSB) of this 23-bit mantissa, a real number x is represented in this floating point format as:

$$x=(2^{(e-127)})*(1 \cdot k)$$

Here, the representation of (1·k) indicates that a binary point is placed immediately to the left of the MSB of the 23-bit data k and the implicit bit immediately to the left of the binary point is always "1". For example, when the 23-bit data k is k=10000000000000000000000 represents $$(1 \cdot k)=b'1.10000000000000000000000=1+0.5=1.5.$$

For another example, k=11100000000000000000000 represents $$(1 \cdot k)=b'1.11100000000000000000000=1+0.5+0.25+ 0.125\ 1.875.$$

The mantissa is a field for representing values of 1 or more but less than 2.

According to the above examples, when a bit pattern represented in the 32-bit floating point format in conformity with the IEEE 754 standard indicates, for instance, 0 10000000 11100000000000000000000, the real number value x indicated by this bit pattern is $$x=(2^{(128-127)})*1.875=3.75.$$

Also, in the case of 0 01111110 10000000000000000000000, the real number value x indicated by this bit pattern is $$x=(2^{(126-127)})*1.5=0.75.$$

In the 32-bit floating point format in conformity with the IEEE 754 standard, a mantissa a and an exponent n in the case of $x=a*2^n$ are converted as mentioned above so as to represent a real number x. Therefore, real numbers in a wide range from $-2^{129} \sim 2^{129}$ can be represented.

On the other hand, there is a fixed point number format as a number format which does not require such a complicated conversion. As shown in FIGS. 2A and 2B, this is a number format without the above-mentioned exponent storage field, where the MSB is usually sign data and a binary point is fixed at a predetermined bit place in the following bits. For example, as shown in FIG. 2A, when a binary point is placed just below the sign bit, the range of represented numbers is limited to -1~+1. For example, 0 1000000000000000000000000000000 represents 0.5 because the MSB is 0, a positive number, and the first bit after the binary point indicates 1. For another example, 0 1100000000000000000000000000000 represents 0.75 (0.5+0.25) because the MSB is 0, a positive number, and the first and second bits after the binary point indicate 1. Positive and negative numbers are usually represented by two's complements, and, for example, 1 0000000000000000000000000000000 represents -1. And, 1 1100000000000000000000000000000 represents -0.25.

If a number unmanageable within the limit of -1~+1 is processed, the binary point is fixedly placed at 2-bit right of the MSB, for example, as shown in FIG. 2B.

For example, 01 010000000000000000000000000000 represents 1.25 because the MSB is 0, a positive number, the bit immediately to the left of the binary point is 1, and the second bit after the binary point is 1.

As described above, as represented by IEEE754, floating point numbers are conventionally represented by a format in which a sign bit, an exponent and a mantissa are stored from the higher order. On the other hand, fixed point numbers are represented by a format in which a sign bit and numbers are stored from the higher order.

However, in the above-mentioned floating point number storage format, in order to extract only the value of the exponent, the most significant 1 bit and the lower 23 bits need to be separated from the 32-bit data, which requires an enormous amount of processing. This is a problem.

On the other hand, in order to extract only the value of the mantissa, the above-mentioned processing of (1·k) needs to be performed after only the value of the lower 23 bits is extracted, which also requires an enormous amount of processing.

In addition, when real numbers x and y which are stored in the above-mentioned floating point format is multiplied, $$x*y=(a*2^n)*(b*2^m)=a*b*2^{(n+m)}$$

is given, where $x=a*2^n$ and $y=b*2^m$. Therefore, the multiplication of the mantissas of the bit fields for x and Y, and the addition of the exponents thereof need to be performed, and thus the exponents and the mantissas need to be separated from the respective bit fields for every multiplication. This processing requires an enormous amount of processing.

On the other hand, in the above-mentioned fixed point number storage format, although the processing amount is less than that in the floating point format because there is no need to separate the exponents and the mantissas for arithmetic, there is a problem that the range of representable numbers are limited.

SUMMARY OF THE INVENTION

Accordingly, the present invention has been conceived in view of these conventional problems, and the object of the present invention is to provide a floating point number storage method and a floating point arithmetic device capable of realizing both wider range of representable numbers by the floating point format and high-speed arithmetic by the fixed point format.

In order to achieve the above-mentioned object, the floating point number storage method according to the present invention is a floating point number storage method for storing a mantissa A and an exponent E of a real number X in a bit field of N bits where the real number X is represented by $A*(2^E)$, the floating point number storage method comprising: a step for storing the mantissa as a fixed point number in upper U bits (high-order bit field of U bits) of the bit field; and a step for storing the exponent as an integer in lower L bits (low-order bit field of L bits) of the bit field, wherein the U and L are respectively integers which satisfy $N \geq (U+L)$.

According to this storage method, since the mantissa is concentrated in the upper bit field and the exponent is concentrated in the lower bit field, the mantissa can be easily extracted by separating only the upper field from the entire bit field and the exponent can also be easily extracted by separating only the lower field from the entire bit field. Also, even if the processing of separating the lower field is omitted in order to extract the mantissa, that is, the value of the entire bits extracted without the processing of separating a part thereof is regarded as the value of the mantissa, the resulting error of numerical data is at most $2^(-24)$ or less, which is practically almost negligible. Therefore, it becomes virtually unnecessary to separate a bit field for extracting the mantissa.

Here, in the floating point number storage method, the N and L may be multiples of 8. If it is assumed that data of a multiple of 8 is stored in a memory when the exponent storage field of the number is the lower 8 bits in the entire bit field. If the area where the lower 8 bits of the entire bit field are stored is accessed byte by byte, the exponent can be extracted automatically, which allows extremely high-speed extraction of the exponent.

Furthermore, the floating point arithmetic device according to the present invention is a floating point arithmetic device for outputting a value obtained by multiplying two real numbers as a floating point number, when a real number X is represented by $A*(2^E)$ where a mantissa is A and an exponent is E, the floating point arithmetic device comprising: a first register and a second register for storing a floating point number including a mantissa storage field of upper U bits for storing the mantissa of the floating point number as a fixed point number and an exponent storage field of lower L bits for storing the exponent of the floating point number as an integer; a multiplier for multiplying the value of the first register and the value of the second register; an adder for adding the value of the first register and the value of the second register; and a bit combiner for combining the upper U bits of the output of the multiplier and the lower L bits of the output of the adder.

According to this arithmetic device, the input data of the entire bit fields of floating point numbers may be multiplied in whole for the multiplication of the mantissas and the addition of the exponents. In addition, the multiplication result can be represented in a floating point format by only combining the upper bits of the output of the multiplier and the lower bits of the output of the adder, which allows extremely high-speed multiplication of floating point numbers.

Also, the floating point arithmetic device according to the present invention may be a floating point arithmetic device for outputting a value obtained by multiplying two real numbers as a fixed point number, when a real number X is represented by $A*(2^E)$ where a mantissa is A and an exponent is E, the floating point arithmetic device comprising: a first register and a second register for storing a floating point number including a mantissa storage field of upper U bits for storing the mantissa of the floating point number as a fixed point number and an exponent storage field of lower L bits for storing the exponent of the floating point number as an integer; a multiplier for multiplying the value of the first register and the value of the second register; an adder for adding the value of the first register and the value of the second register; and a bit shifter for shifting the value of the upper U bits of the output of the multiplier according to the value of the lower L bits of the output of the adder.

According to this arithmetic device, the input data of the entire bit field of floating point numbers may be multiplied in whole for the multiplication of the mantissas and the addition of the exponents. In addition, the multiplication result can be represented in a fixed point format by only shifting the output of the multiplier based on the lower value of the output of the adder.

In addition, the floating point arithmetic device according to the present invention is a floating point arithmetic device for converting a real number into an integer, when the real number X is represented by $A*(2^E)$ where a mantissa is A and an exponent is E, the floating point arithmetic device comprising: a register for storing the floating point number including a mantissa storage field of upper U bits for storing the mantissa of the floating point number as a fixed point number and an exponent storage field of lower L bits for storing the exponent of the floating point number as an integer; and a bit shifter for shifting the value stored in the register according to the value indicated by the lower L bits of the register. And, the floating point arithmetic device further comprises a subtracter for calculating (N–S–x), when the number of bits of the register is N, the number of bits upper than a binary point in the mantissa storage field is S, and the value indicated by the lower L bits of the register is x, wherein the bit shifter shifts the value stored in the register by the number of bits indicated by the output value of the subtracter.

According to this arithmetic device, an arbitrary floating point number can be converted into an integer by only a subtracter and a bit shifter, which realizes a converter for converting a real number into an integer with an extremely small circuit size.

Here, the subtracter may further calculate (N—S—x—P) when a predetermined number is P, and the bit shifter may shift the value stored in the register by the number of bits indicated by the output value of the subtracter.

According to this arithmetic device, an arbitrary floating point number can be converted into a number whose X bits lower than the binary point is made into significant digits by only a subtracter and a bit shifter, which realizes a converter for converting a real number into a number whose bits below the binary point is made into significant digits with an extremely small circuit size.

The present invention may be realized as an arithmetic device not only for multiplying numbers of the floating point format but also for multiplying a number of the fixed point format and a number of the floating point format, or may be realized as an arithmetic method including steps executed by the units included in the arithmetic device. In addition, the present invention can be realized not only as hardware such as a microprocessor and a DSP (Digital Signal Processor) but also as a program for causing a computer to execute such an arithmetic method. And the program can, of course, be distributed via a recording medium such as a CD-ROM or a transmission medium such as the Internet.

As described above, the present invention allows multiplication of floating point numbers using an arithmetic unit for fixed point numbers without any special circuit or the like if only the conventional floating point format is modified. In addition, the present invention realizes high-speed multiplication and representation of floating point numbers in integers, and thus the practical value of the present invention is extremely high particularly as a technique for high-speed processing of multimedia data such as audio and video processing requiring a heavy use of multiplication processing.

As further information about technical background to this application, Japanese Patent Application No. 2002-180630 filed Jun. 20, 2002 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

First Embodiment

The floating point number storage method in the first embodiment of the present invention will be explained below with reference to drawings.

Figure 3:
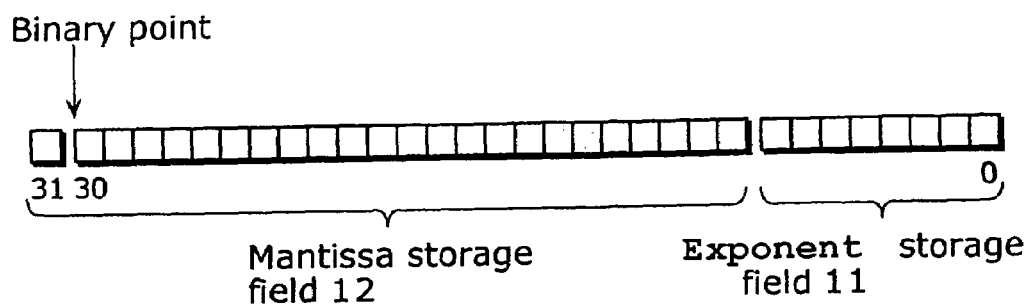
FIG. 3 is a diagram showing an example of a floating point number data storage format in a first embodiment of the present invention.

FIG. 3 is a diagram showing a bit field of a real number x to be stored by the floating point number storage method in the first embodiment of the present invention. This bit field includes an exponent storage field 11 and a mantissa storage field 12.

In the exponent storage field 11, the value n is stored as an 8-bit integer where the real number x is represented by $a*2^n$. The value is represented in two's complement, for instance. In the mantissa storage field 12, the value x is stored in 24 bits where the real number x is represented by $a*2^n$. The value is represented by a fixed point number whose binary point is fixedly placed. In the present embodiment, the value a is normalized so as to be within the range of $-1 \sim +1$. Therefore, this 24-bit structure, in which the MSB is a sign bit and the binary point is fixed just below the sign bit, represents a fixed point number that is a two's complement. In other words, this is a number representation in which the 1-bit below the MSB represents 0.5 ($2^{(-1)}$) and the following bits represent 0.25 ($2^{(-2)}$), 0.125 ($2^{(-3)}$) and so on in the same manner.

As an actual example of the floating point number storage method with the above-mentioned bit field will be explained below.

First, the case where a real number x=29.25 is stored by the floating point number storage method of the present embodiment will be explained.

When the real number x is represented by $a*2^n$, $$29.25 = 0.9140625 * 2^5$$

is established, and thus a=0.9140625 and n=5 are obtained. Therefore, 5 (=b'00000101) is stored in the exponent storage field 11 in FIG. 3, and a value of a two's complement represented as a fixed point number (b'011101010000000000000000) is stored in the mantissa storage field 12.

Accordingly, the entire bit stream representing the real number 29.25 is b'011101010000000000000000 00000101.

Next, the case where a real number x=0.009033203125 is stored by the floating point number storage method of the present embodiment will be explained.

When the real number x is represented by $a*2^n$, $$0.009033203125 = 0.578125 * 2^{(-6)}$$

is established, and thus a=0.578125 and n=−6 are obtained. Therefore, in the exponent storage field 11 in FIG. 3, −6(=b'11111010) is stored.

In the mantissa storage field 12, the value (b'010010100000000000000000) representing 0.578125 by a fixed point number of a two's complement is stored.

Accordingly, the entire bit stream representing the real number 0.009033203125 is b'010010100000000000000000 11111010.

Next, the case where a real number x=−4.0010986328125 is stored by the floating point number storage method of the present embodiment will be explained.

When the real number x is represented as $a*2^n$, since
−4.0010986328125=−0.5001373291015625*2^3 is established,
a=−0.5001373291015625 and n=3 are derived. Therefore, in the exponent storage field 11 in FIG. 3, 3(=b'00000011) is stored. In the mantissa storage field 12, a value representing −0.5001373291015625 as a fixed point number of a two's complement is stored.

Here, two's complements for a negative fixed point number will be explained.

If the absolute value of above-mentioned −0.5001373291015625 is represented by a two's complement, it is
b'0100000000000010010000000.

When a negative value is represented by a two's complement, this value can be obtained by inverting all the bits and adding 1 to the least significant bit. Therefore, −0.5001373291015625 is represented by a two's complement as
b'101111111111101100000000.

Accordingly, the entire bit stream representing the real number −0.5001373291015625 is
b'101111111111101100000000 00000011.

In the above example, the exponent storage field 11 is 8 bits and the mantissa storage field 12 is 24 bits, but the present invention is not limited to that, and the number of bits may be changed depending upon the range of significant values. For example, if the exponent storage field is 6 bits and the mantissa storage field is 26 bits, the value precision (the number of digits representing the mantissa) is improved by 2 bits, but the range of significant values is narrowed by 2 bits.

In addition, in the present embodiment, the values stored in the mantissa storage field 12 are those which are normalized in the range of −1~+1, but those values may be normalized in the range of

−2~+2.

Figure 4:
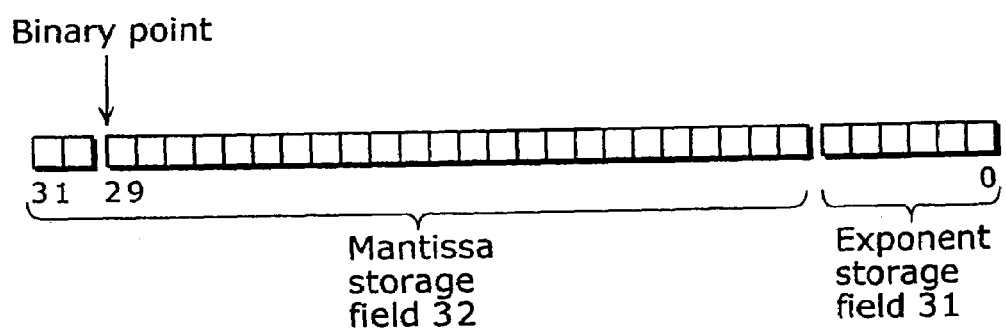
FIG. 4 is a diagram showing another example of a floating point number data storage format.

FIG. 4 shows a bit field in the case where the exponent storage field 31 is 6 bits and the mantissa storage field 32 is 26 bits and the value of the mantissa is normalized in the range of −2~+2. As shown in this figure, the binary point is fixedly placed between the second and third bits from the MSB. For example, in the above-mentioned example, the entire bit stream representing the real number 29.25 is
b'01110101000000000000000 00000101, that is, 29.25 is represented as 0.9140625*2^5. However, in the bit field as shown in FIG. 4, since 29.25 is represented as 1.828125*2^4 and the exponent is 6 bits, the entire bit stream is
b'01110101000000000000000000 000100.

As described above, according to the present embodiment, when a real number x is represented by $a*(2^n)$ where n is an exponent and a is a mantissa, the mantissa a is stored as a fixed point number in upper U bits (high-order bit field of U bits) of the bit field of (N≧(U+L)), and the exponent n is stored as a floating point number in the lower L bits (low-order bit filed of L bits) thereof. Thereby, the mantissa is concentrated in the upper bit field and the exponent is concentrated in the lower bit field, and thus the mantissa can be easily extracted by separating only the upper field from the entire bit field, while the exponent can be easily extracted by separating only the lower field from the entire bit field.

In addition, according to the floating point number storage method of the present embodiment, the mantissa is stored in the upper side of the entire bit field and the exponent is stored in the lower side following the mantissa. Therefore, even if the processing of separating the lower side (exponent) field is omitted to extract the mantissa, that is, all the bits are extracted at a time without the separating processing and the value represented by the entire field is regarded as a mantissa value in whole, the resulting numerical value data error can be practically negligible because it is at most $2^{(-24)}$ or less, and thus the processing of separating the bit field is virtually unnecessary for extracting the mantissa value. This is the biggest advantage of the floating point number storage method in the present embodiment.

For example, in the above-mentioned example, the entire bit stream representing a real number 29.25 is
b'01110101000000000000000 00000101, that is, 29.25 is represented as 0.9140625*2^5. Strictly speaking, the mantissa including a sign bit is upper 24 bits, but even if all the 32 bits are regarded as a mantissa, the mantissa value is 0.91406250232 . . . , which produces a minute error. Therefore, if a value obtained by accessing the entire bit field in whole is assigned to a mantissa and a value obtained by accessing only the lower bits is assigned to an exponent, approximately accurate floating point number can be obtained, and thus the amount of bit separating processing can be substantially reduced.

Furthermore, particularly if the least significant 8 bits out of the entire bit field are assigned to the exponent storage field 11, special effect as mentioned below can be additionally obtained.

Figure 1:
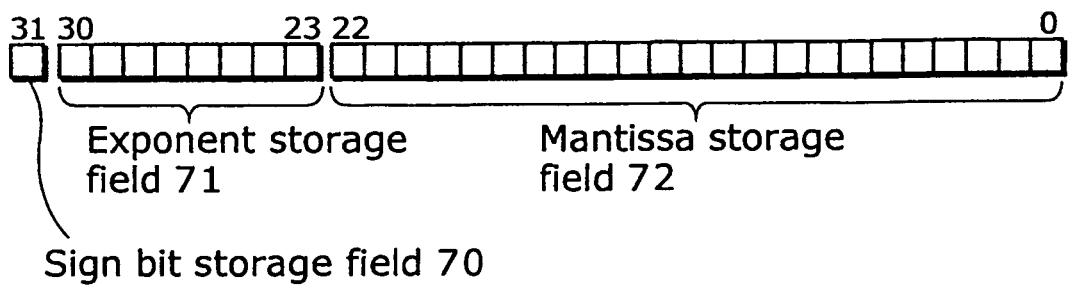
FIG. 1 is a diagram showing a bit field of a 32-bit floating point format according to IEEE754.
Figure 5:
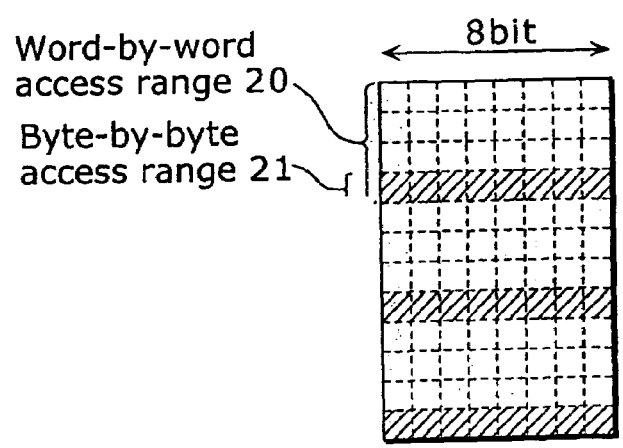
FIG. 5 is a diagram showing the arrangement of the bit field in the case where the floating point data number as shown in FIG. 3 is stored in a memory.

FIG. 5 is a diagram showing an arrangement of a bit field on a memory in the case where the numerical value data as shown in FIG. 4 is stored in the memory. In the case of word-by-word access, as shown by the word-by-word access range 20 in FIG. 5, reading and/or writing is performed in a real number unit represented as a floating point number. On the other hand, in the case of byte-by-byte access, as shown by the byte-by-byte access range 21 in FIG. 5, reading and/or writing is performed in the unit of the exponent storage field 11. Note that in the conventional format, as shown in FIG. 1, the exponent storage field 71 cannot be read or written by one byte access as in the present embodiment because it is not stored in a byte-aligned location in the entire bit field.

As described above, when the mantissa storage field is arranged in the lower 8 bits in the entire bit field, the exponent can be extracted by one access if the area where the lower 8 bits of the entire bit field is stored is accessed byte by byte, which allows extremely high-speed extraction of the exponent.

Second Embodiment

Next, the floating point arithmetic device according to the second embodiment of the present invention will be explained with reference to the figures.

Figure 6:
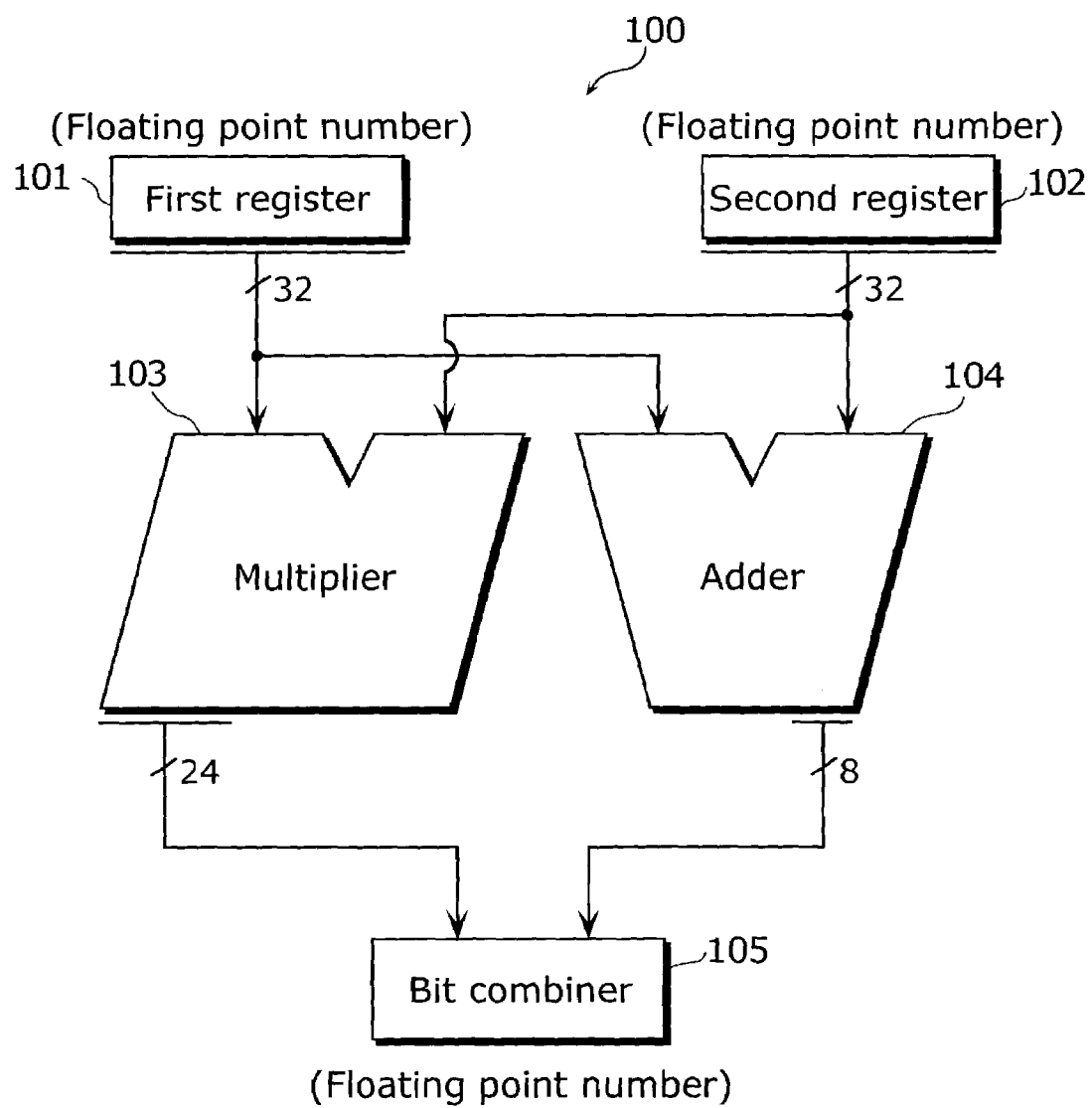
FIG. 6 is a block diagram showing the structure of a floating point arithmetic device in a second embodiment of the present invention.

FIG. 6 is a block diagram showing the structure of a floating point arithmetic device 100 in the second embodiment of the present invention. In the present embodiment, the floating point arithmetic device 100 for multiplying floating point numbers x and y will be explained. Here, it is assumed that the floating point number storage format complies with the format as mentioned in the first embodiment. Since multiplication is performed according to the expression $$X*y=a*b*(2^{(n+m)}), \text{ where } x=a*(2^n) \text{ and } y=b*(2^m),$$

multiplication of mantissas and addition of exponents are the main arithmetic.

The floating point arithmetic device 100, which is an arithmetic circuit for multiplying two real numbers of 32 bits long and outputs the multiplication result in the floating point format, includes a first register 101, a second register 102, a multiplier 103, an adder 104 and a bit combiner 105.

When a real number x is represented by $a*(2^n)$ where a mantissa is a and an exponent is n, the first register 101 is a register of 32 bits for storing a real number, having the upper 24 bits of a mantissa storage field and the lower 8 bits of an exponent storage field. Similarly, the second register 102 is a register of 32 bits for storing a real number, having the upper 24 bits of a mantissa storage field and the lower 8 bits of an exponent storage field. The multiplier 103 multiplies the value of the first register 101 and the value of the second register 102, the adder 104 adds the value of the first register 101 and the value of the second register 102, and the bit combiner 105 combines the upper 24 bits of the output of the multiplier 103 and the lower 8 bits of the output of the adder 104.

In this case, since the floating point numbers are stored in the first register 101 and the second register 102 in the format as shown in FIG. 3 which is same as that in the first embodiment, the entire bit stream representing a real number 29.25 is, for instance, b'01110101000000000000000 00000101, and the entire bit stream representing a real number 0.009033203125 is, b'010010100000000000000000 11111010.

The floating point arithmetic device 100 that manages the numbers having these bit fields will be explained. It is assumed that the value 29.25 is stored in the first register 101. The entire bit stream representing 29.25 is b'01110101000000000000000 00000101.

It is also assumed that the value 0.009033203125 is stored in the second register 102. The entire bit stream representing 0.009033203125 is b'010010100000000000000000 11111010.

The multiplier 103 multiplies the value of the first register 101 and the value of the second register 102. This multiplication is a process of multiplying two mantissas, and specifically speaking, the mantissas are extracted from the entire bit fields of 32 bits by separating the exponents of the lower 8 bits respectively so as to multiply both values. In the present embodiment, the entire bit fields of 32 bits are extracted in whole respectively so as to multiply both values. This multiplication causes an error from the proper value, but the error is virtually negligible because it is at most $2^{(-24)}$ or less.

More specifically, in the above case, the mantissa value stored in the first register is, to be precise, b'011101010000000000000000, which is represented as 0.9140625 in a decimal number, while if the entire bit field is regarded as the mantissa, the value is b'01110101000000000000000000000101, which is represented as 0.91406250232831 . . . in a decimal number.

Further, the mantissa value stored in the second register is, to be precise, b'010010100000000000000000, which is represented as 0.578125 in a decimal number, while if the entire bit field is regarded as the mantissa, the value is b'01001010000000000000000011111010, which is represented as 0.57812511641532 . . . in a decimal number.

The result of multiplying the mantissas which are extracted precisely is 0.9140625*0.5781250=0.5284423828125, which is represented in a binary number as b'010000111010010000000000000000000.

On the other hand, the result of multiplying the mantissas in the case where the entire bit fields are regarded as the mantissas is 0.91406250232831*0.57812511641532=0.52844249056943, which is represented in a binary number as b'01000011101001000000000011100111.

It is noteworthy here that the multiplication result of the precisely extracted mantissas is equal to that of the mantissas in the case where the entire bit fields are regarded as the mantissas in the upper 24 bits. In other words, this multiplier 103 calculates, as a result, approximately same value as the value obtained by multiplying only the extracted mantissas without extracting the mantissas of these two real numbers, and thus the processing time and circuit are reduced by the amount of saving extraction processing.

Next, the adder 104 adds the value of the first register 101 and the value of the second register 102. This addition is a process of adding two exponents, and strictly speaking, only the lower 8 bits are extracted from the entire bit fields of 32 bits so as to add the exponents. In the present embodiment, the entire bit field of 32 bits are extracted so as to add the values thereof in whole. That is why the lower values of the addition result are not influenced by the upper values of the input data because the exponents are stored in the lower bit fields and thus there is no need to separate the upper bits for addition. More specifically, in the above example, since the value of the first register 101 is b'01110101000000000000000000000101, and the value of the second register 102 is b'01001010000000000000000011111010, the output of the adder 104 is b'10111111000000000000000011111111.

The lower 8 bits of the addition result is, of course, equal to the result of adding the extracted lower 8-bit values.

Next, the bit combiner 105 combines the upper 24 bits of the output of the multiplier 103 and the lower 8 bits of the output of the adder 104.

Figure 7:
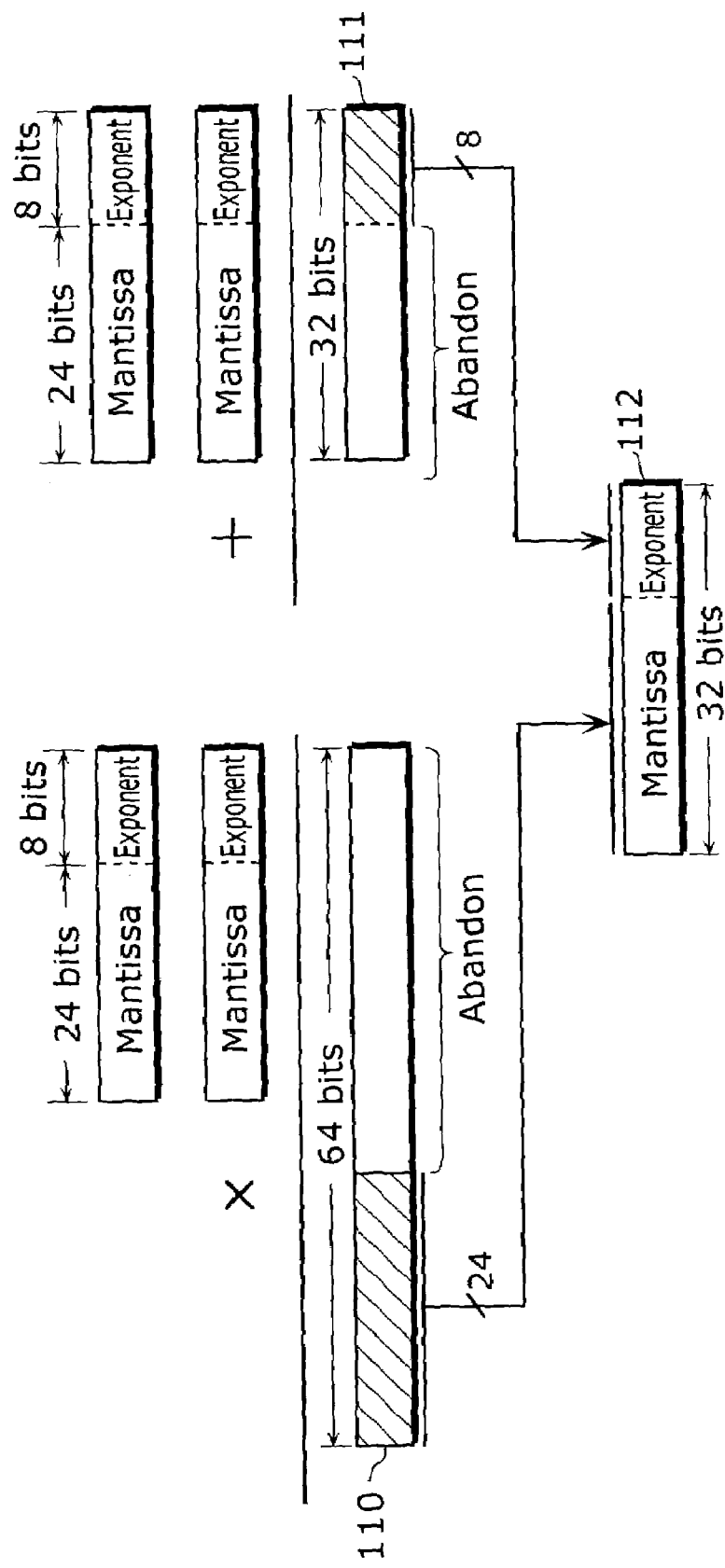
FIG. 7 is a diagram showing operation of a bit combiner in the floating point arithmetic device as shown in FIG. 6.

FIG. 7 shows how the bit combiner 105 combines bits. 64-bit data 110 shown in the left side of this figure is an output bit stream from the multiplier 103. In this bit stream, the hatched portion (the upper 24 bits) are bits to be extracted, that is, a significant range as an arithmetic result, and inputted to the upper digits of the bit combiner 105. On the other hand, 32-bit data 111 shown in the right side of this figure is an output bit stream from the adder 104. In this bit stream, the hatched portion (the lower 8 bits) are bits to be extracted, that is, a significant range as an arithmetic result, and inputted to the lower digits of the bit combiner 105. 32-bit data 112 shown in the lower part of this figure is a bit stream after the bits which are respectively extracted from the 64-bit data 110 and 32-bit data 111 are combined. This 32-bit data 112 is a result of combining the significant bits of the outputs respectively from the multiplier 103 and the adder 104.

Specifically, since the output of the multiplier 103 is
b'01000011010010000000000011100111, and the output of the adder 104 is
b'10111111000000000000000011111111, the output of the bit combiner 105 is
b'01000011010010000000000011111111.

If the bit stream 112 obtained as above is converted into a decimal number according to the floating point number storage format in the present embodiment, 0.5284423828125*2^(−1)=0.26422119140625 is obtained, which is equal to the multiplication result of the original input values 29.25 and 0.009033203125.

As described above, the present embodiment allows extremely high-speed multiplication of floating point numbers. More specifically, when a real number x is represented by $a*(2^n)$ where a mantissa is a and an exponent is n, the present embodiment includes the first and second registers respectively having mantissa storage fields of the upper U bits for storing mantissas of real numbers as floating point numbers and exponent storage fields of the lower L bits for storing exponents of real numbers as integers, the multiplier for multiplying the value of the first register and the value of the second register, the adder for adding the value of the first register and the value of the second register, and the bit combiner for combining the upper U bits of the output of the multiplier and the lower L bits of the output of the adder, and thus makes it possible, in the multiplication of the floating point numbers, to multiply the mantissas and add the exponents using the entire bit fields of the input data in whole, and to convert the multiplication result into the data in the floating point format by just combining the upper bits of the output of the multiplier and the lower bits of the output of the adder.

In the present embodiment, the multiplication result of the floating point numbers are stored after being converted into the data in the floating point format. However, it is easy to convert the multiplication result into the data in the fixed point format.

Figure 8:
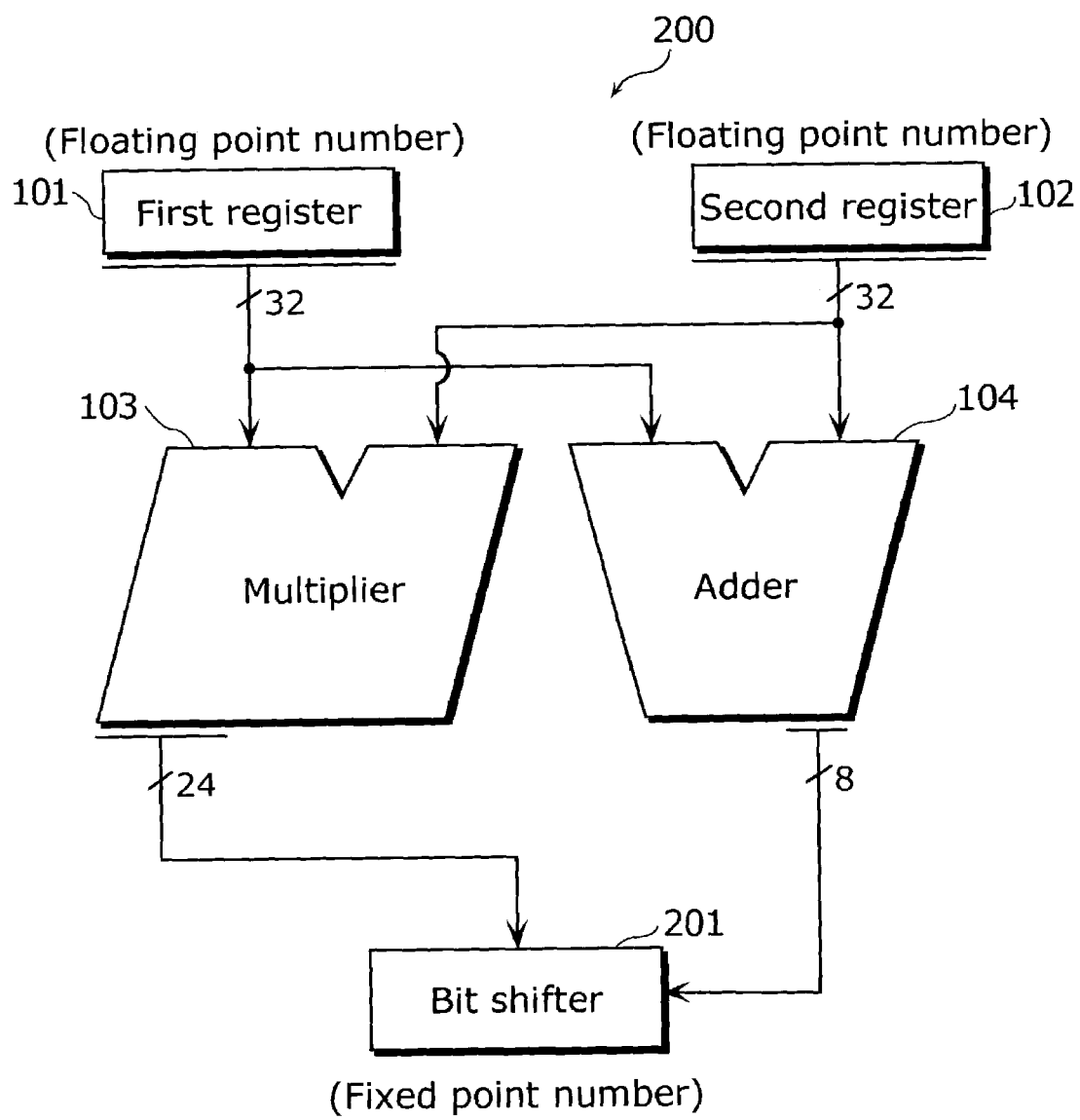
FIG. 8 is a block diagram showing another structure of the floating point arithmetic device.

FIG. 8 is a block diagram showing the structure of a floating point arithmetic device 200 structured like that. The floating point arithmetic device 200, which is an arithmetic circuit for multiplying two real numbers of 32 bits long and outputting the multiplication result in the fixed point format, includes the first register 101, the second register 102, the multiplier 103, the adder 104 and a bit shifter 201. The same numbers are assigned to the same components of the floating point arithmetic device 100. The floating point arithmetic device 200 is different from the floating point arithmetic device 100 as shown in FIG. 6 in that the former is equipped with the bit shifter 201 instead of the bit combiner 105. The bit shifter 201 is a shift register of 32 bits that carries out a bit shift of the output of the multiplier 103 depending upon the lower 8-bit value of the output of the adder 104. Taking the numbers in the above-mentioned case for example, since the output of the multiplier 103 is
0.5284423828125, and the lower 8-bit value of the output of the adder 104 is −1, the bit shifter 201 shifts down the output value of the multiplier by 1 bit so as to generate, as a result,
0.26422119140625, as is the case of the floating point arithmetic device 100 shown in FIG. 6. In this case, since the exponent information is insignificant, there is no need to combine the value of the exponent with the lower 8 bits.

The floating point number storage method and the floating point arithmetic device of the present invention have been explained based on the first and second embodiments, but the present invention is not limited to these embodiments.

For example, the floating point number storage method according to the present invention is a format useful for increasing the speed not only of multiplying two floating point data but also of multiplying a fixed point number and a floating point number. Therefore, the floating point number storage method according to the present invention is applicable to an arithmetic device for fixed point numbers.

Figure 9:
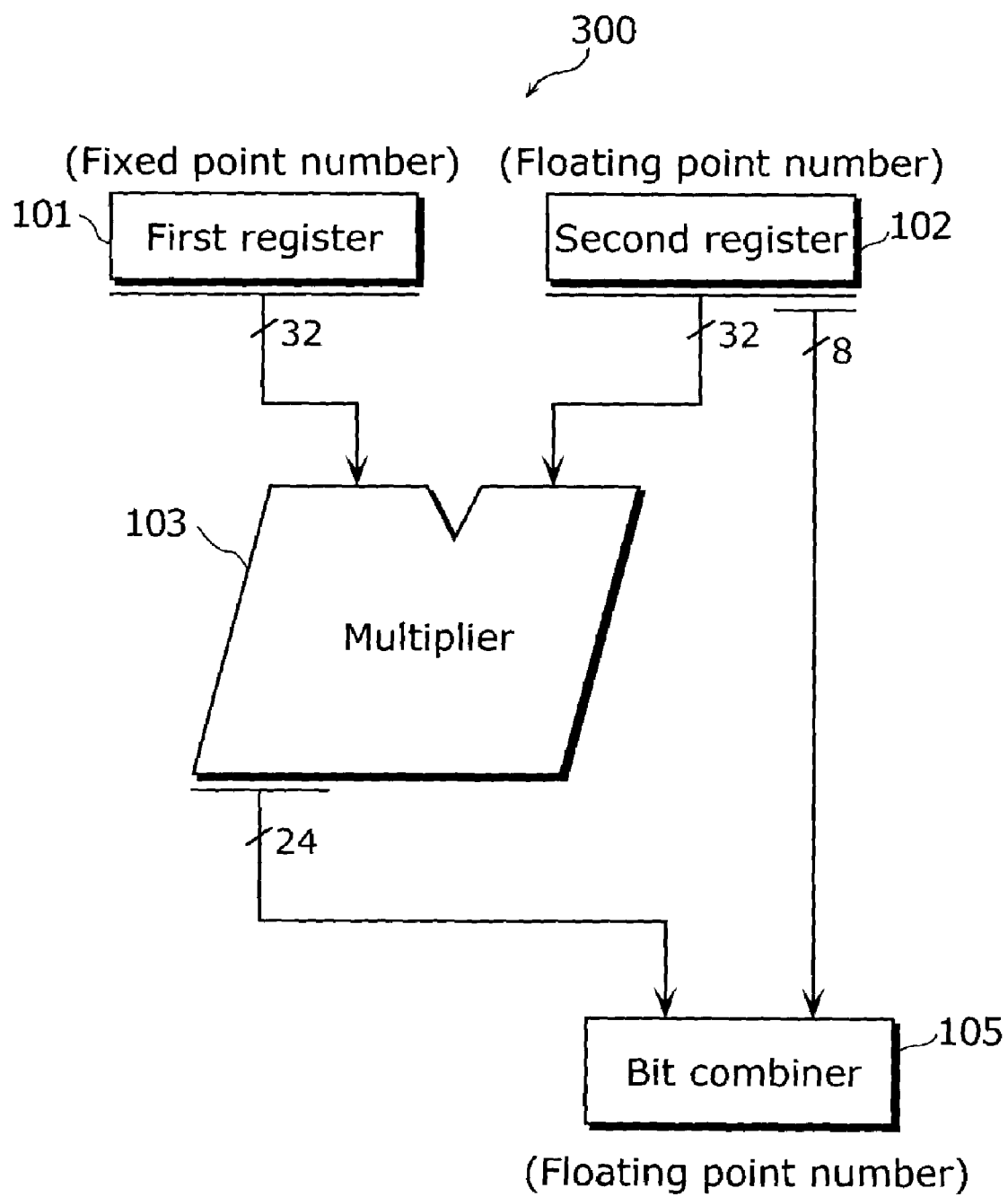
FIG. 9 is a block diagram showing the structure of a floating point arithmetic device for multiplying a fixed point number and a floating point number.

FIG. 9 is a block diagram showing the structure of a floating point arithmetic device 300 for multiplying a fixed point number and a floating point number and outputting the multiplication result as a floating point number. This floating point arithmetic device 300 includes the same components as those of the floating point arithmetic device 100 as shown in FIG. 6, except for the adder 104 deleted. Note that the first register 101 holds a fixed point number of 32 bits.

Figure 10:
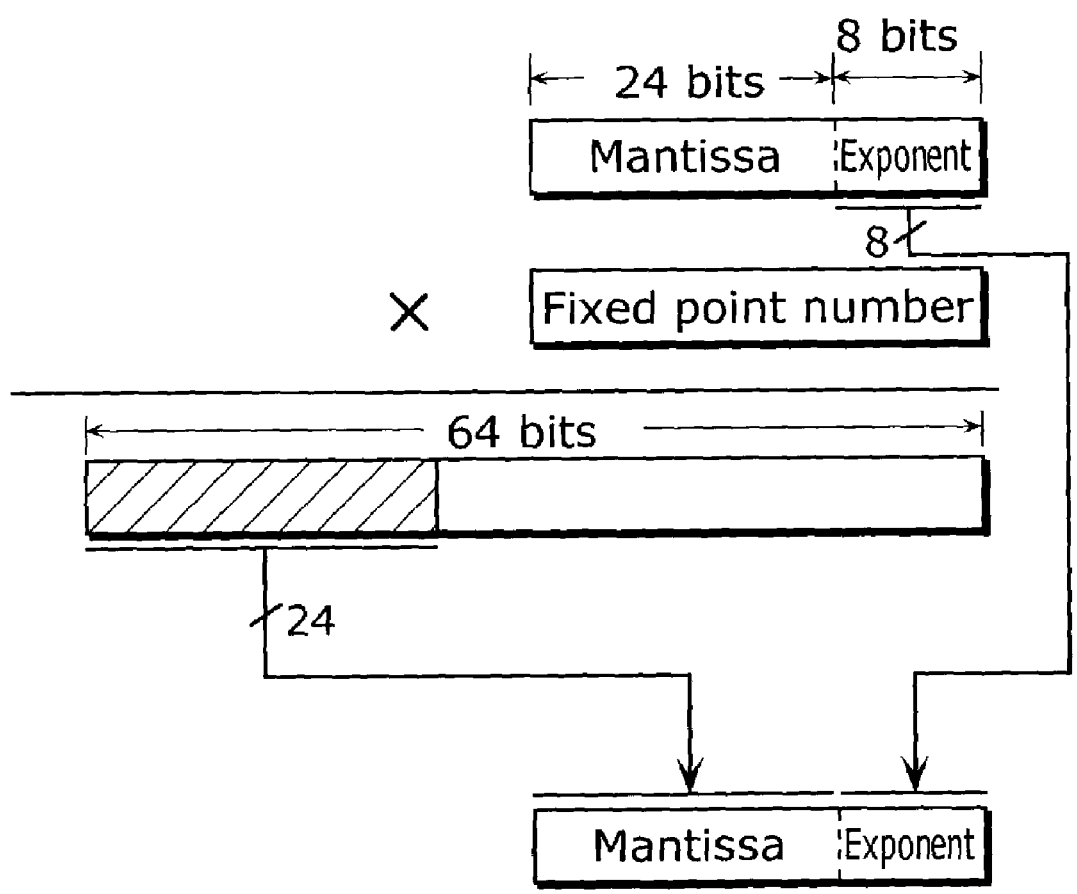
FIG. 10 is a diagram showing operation of a bit combiner in the floating point arithmetic device as shown in FIG. 9.

The multiplier 103 multiplies 32-bit data stored in the first register 101 and 32-bit data stored in the second register in whole (both as fixed point numbers), and outputs the multiplication result of 64 bits. As shown in FIG. 10, the bit combiner 105 combines the significant bits (the upper 24 bits) out of 64 bits obtained by the multiplier 103 as upper bits and the exponent (the lower 8 bits) stored in the second register 102 as lower bits. Even in this floating point arithmetic device 300, since the multiplier 103 can multiply 32-bit data stored in the second register 102 in whole without extracting only the mantissa from the 32-bit data, the arithmetic speed can be enhanced.

Figure 11:
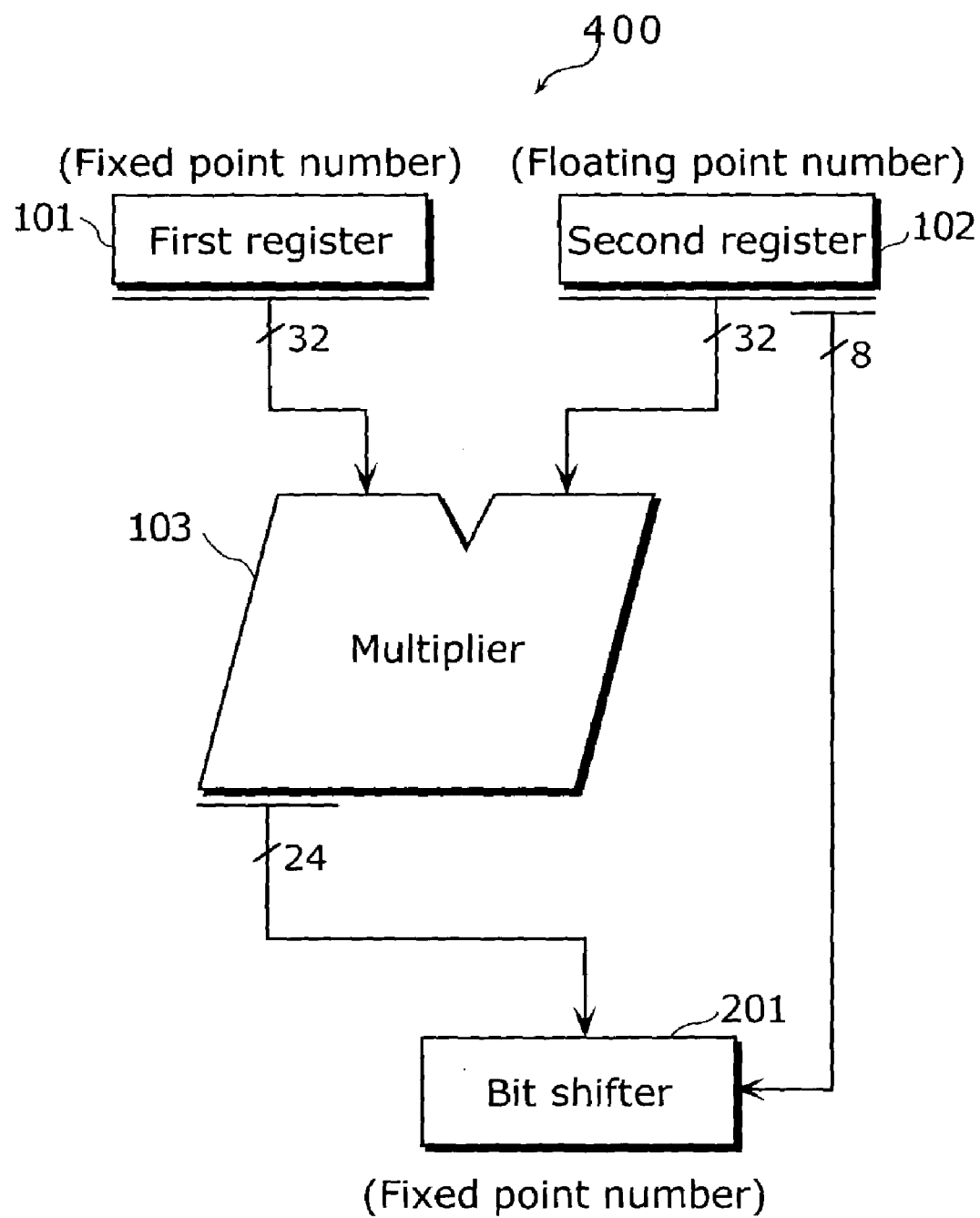
FIG. 11 is a block diagram showing another structure of the floating point arithmetic device for multiplying a fixed point number and a floating point number.

FIG. 11 is a block diagram showing the structure of a floating point arithmetic device 400 for multiplying a fixed point number and a floating point number and outputting the multiplication result as a fixed point number. This floating point arithmetic device 400 includes the same components as those of the floating point arithmetic device 200 as shown in FIG. 8, except for the adder 104 deleted. Note that the first register 101 holds a fixed point number of 32 bits.

The multiplier 103 multiplies 32-bit data stored in the first register 101 and 32-bit data stored in the second register in whole (both as fixed point numbers) and outputs the multiplication result of 64 bits. After extracting the significant bits (the upper 24 bits) out of 64 bits obtained by the multiplier 103, the bit shifter 201 shifts the value of the extracted bits by the number of bits depending upon the exponent (the lower 8 bits) stored in the second register 102. Even in this floating point arithmetic device 400, since the multiplier 103 can multiply the 32-bit data in whole without extracting only the mantissa from the 32-bit data stored in the second register, the arithmetic speed can be enhanced.

Third Embodiment

Next, the floating point arithmetic device in the third embodiment of the present invention will be explained with reference to the figures.

Figure 12:
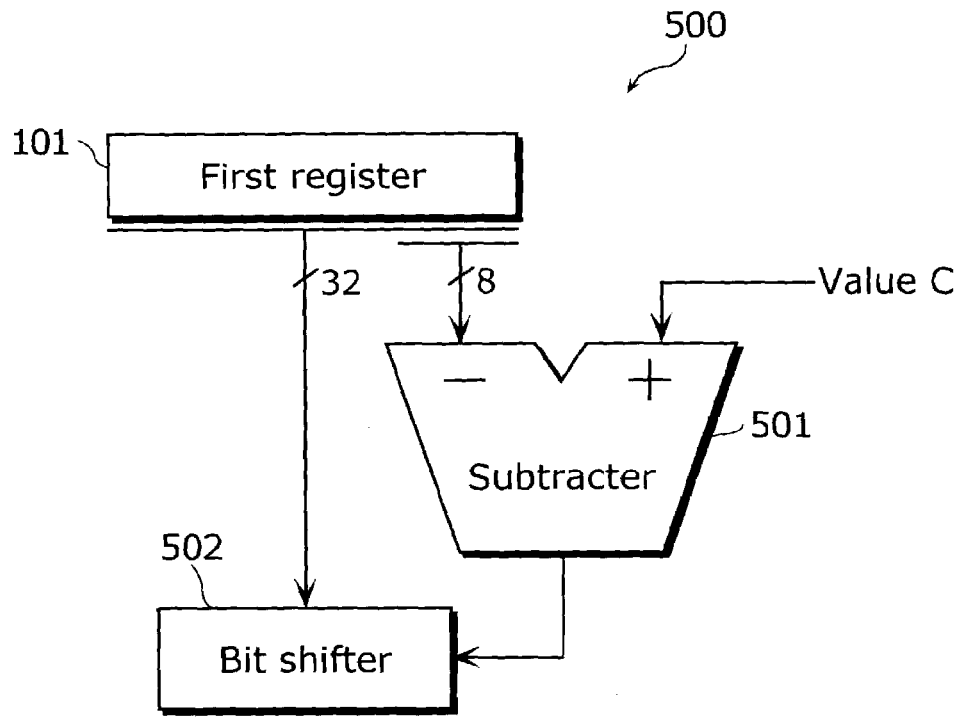
FIG. 12 is a block diagram showing the structure of a floating point arithmetic device in a third embodiment of the present invention.

FIG. 12 is a block diagram showing the structure of the floating point arithmetic device in the third embodiment of the present invention. The floating point arithmetic device 500, which is an arithmetic device for converting floating point numbers into integers, includes the first register 101, a subtracter 501 and a bit shifter 502.

The first register 101, which is same as the register in the first embodiment, holds a real number x having a mantissa storage field of the upper 24 bits and an exponent storage field of the lower 8 bits when the real number x is represented by a*(2^n) where the mantissa is a and the exponent is n.

The subtracter 501 subtracts x from a predetermined value C where the value of the lower 8 bits stored in the first register 101 is x, and the bit shifter 502 shifts the value stored in the first register 101 to the right by the number of bits corresponding to the output value of the subtracter 501.

Figure 2A:
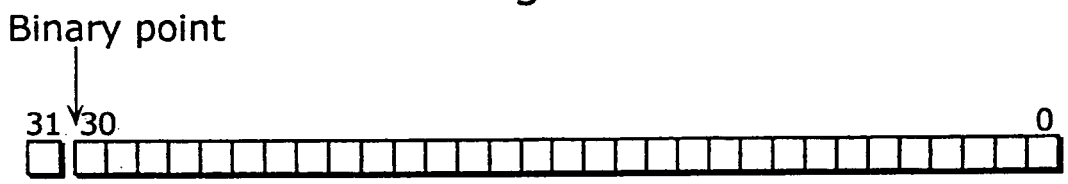
FIG. 2A is a diagram showing a fixed point format known in the art.
Figure 2B:
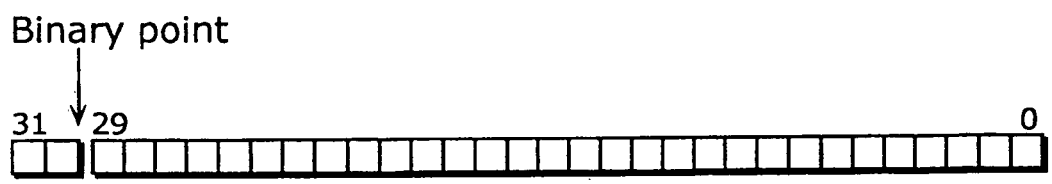
FIG. 2B is a diagram showing another fixed point format known in the art.
Figure 13:
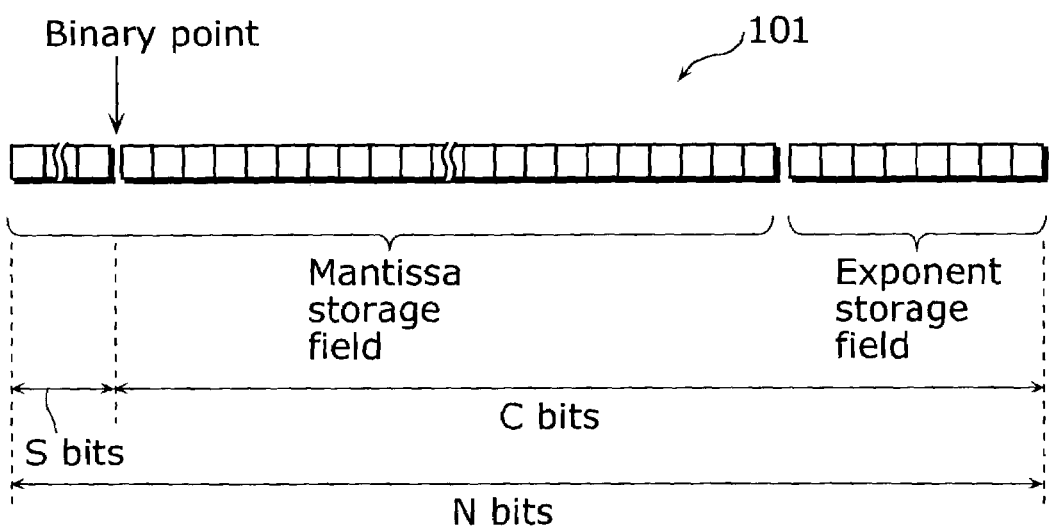
FIG. 13 is an illustrative diagram of the value C which is to be input into a subtracter as shown in FIG. 12.

As shown in FIG. 13, the value C inputted to the subtracter 501 is $$C=N-S.$$

when the number of the entire bits stored in the first register 101 is N and the number of bits higher than the binary point in the mantissa storage field is S. For example, the value S is 1 if the bit field format of the value stored in the first register 101 is the format as shown in FIGS. 3, and 2 if it is the format as shown in FIG. 4. In other words, S indicates the number of bits higher than the binary point in the mantissa storage field of the floating point number stored in the first register 101.

It is assumed that the format of the floating point number stored in the first register 101 is the format as shown in FIG. 3, which is same as that in the first embodiment. For example, the entire bit stream representing a real number 29.25 is b'01110101000000000000000 00000101.

Next, actual operation of the floating point arithmetic device 500 structured as above will be explained.

It is assumed that the real number 29.25 is stored in the first register 101, that is, the bit stream b'01110101000000000000000 00000101 is stored.

The subtracter 501 subtracts the value of the lower 8 bits of the data stored in the first register 101 from the value C. Here, since the number of bits N of the data stored in the first register 101 is 32 and the number of bits S higher than the binary point in the mantissa storage field is 1, $$C=N-S=32-1=31$$

is obtained. On the other hand, since the value of the lower 8 bits of the data stored in the first register 101 is 5, the output value of the subtracter 501 is $$31-5=26.$$

Then, the bit shifter 502 shifts the value of the first register to the right by the number of bits indicated by the output value (26) from the subtracter 501. As a result, the real number stored in the first register 101, that is, b'01110101000000000000000 00000101 is shifted to the right by 2 bits, and as a result,
b'00000000000000000000000000011101=29 is obtained. This value "29" is equal to the value obtained by rounding off the floating point number 29.25 stored in the first register 101 to be an integer.

As described above, the present embodiment allows extremely high-speed conversion of floating point numbers into integers. More specifically, when a real number x is represented by a*(2^n) where the mantissa is a and the exponent is n, the present embodiment includes the first register 101 having a mantissa storage field of the upper U bits for storing the mantissa of the real number as a fixed point number and an exponent storage field of the lower L bits for storing the exponent of the real number as an integer, and the bit shifter 502 for carrying out the bit shift of the value stored in the first register 101 depending on the value indicated by the lower L bits of the first register 101, and thus makes it possible to convert the floating point number into an integer by only subtraction and bit shift.

In the present embodiment, an input value C to a plus side of the subtracter is a value obtained by (the number of bits N of the first register 101)-(the number of bits S higher than the binary point in the mantissa storage field of the floating point number stored in the first register 101), but instead, C may be a value obtained by further subtracting a predetermined value X from the above value. For example, in the case of X=4, the bit shift amount is $$32-1-5-4=22,$$

and, as a result,
b'01110101000000000000000 00000101 is shifted to the right by 22 bits, and
b'00000000000000000000000111010100 is obtained. This value is representation of the floating point number 29.25 with the significant 4 bits after the binary point. In this manner, if a value X is appropriately set, representation of a significant X bits after a binary point of a floating point number can be easily realized.

What is claimed is:

1. A floating point arithmetic device for outputting a value obtained by multiplying two real numbers as floating point numbers, resulting in a floating point number, wherein the floating point numbers include a mantissa and an exponent, said floating point arithmetic device comprising:

a first register of N bits, including a high-order bit field of U bits and a low-order bit field of L bits, where N≧(U+L), for storing a floating point number, wherein the high-order bit field is of higher-significance than the low-order bit field, the high-order bit field stores the entire mantissa of the first number as a fixed point number, and the low-order bit field stores the entire exponent of the first number as an integer;

a second register of N bits, including a high-order bit field of U bits and a low-order bit field of L bits, where N≧(U+L), for storing a floating point number, wherein the high-order bit field is of higher-significance than the low-order bit field, the high-order bit field stores the entire mantissa of the second number as a fixed point number, and the low-order bit field stores the entire exponent of the second number as an integer;

a multiplier for multiplying the entire value of said first register as a fixed point number and the entire value of said second register as a fixed point number to obtain a multiplication result, wherein the multiplication result contains a mantissa bit field of at least U bits and an exponent bit field of at least L bits, wherein bits in the mantissa bit field are of higher-significance than bits in the exponent bit field;

an adder for adding the entire value of said first register as a fixed point number and the entire value of said second register as a fixed point number to obtain an addition result, wherein the addition result contains a mantissa bit field of U bits and an exponent bit field of L bits, wherein bits in the mantissa bit field are of higher-significance than bits in the exponent bit field; and a bit combiner for combining the highest-order U bits of the mantissa bit field of the multiplication result with the L bit exponent bit field of the addition result.

2. A floating point arithmetic device for outputting a value obtained by multiplying two real numbers as floating point numbers, resulting in a fixed point number, wherein the floating point numbers include a mantissa and an exponent, said floating point arithmetic device comprising:

a first register of N bits, including a high-order bit field of U bits and a low-order bit field of L bits, wherein $N \geq (U+L)$, for storing a floating point number, wherein the high-order bit field is of higher-significance than the low-order bit field, the high-order bit field stores the entire mantissa of the first number as a fixed point number, and the low-order bit field stores the entire exponent of the first number as an integer;

a second register of N bits, including a high-order bit field of U bits and a low-order bit field of L bits, wherein $N \geq (U+L)$, for storing a floating point number, wherein the high-order bit field is of higher-significance than the low-order bit field, the high-order bit field stores the entire mantissa of the second number as a fixed point number, and the low-order bit field stores the entire exponent of the second number as an integer;

a multiplier for multiplying the entire value of said first register as a fixed point number and the entire value of said second register as a fixed point number to obtain a multiplication result, wherein the multiplication result contains a mantissa bit field of at least U bits and an exponent bit field of at least L bits, wherein bits in the mantissa bit field are of higher-significance than bits in the exponent bit field;

an adder for adding the entire value of said first register as a fixed point number and the entire value of said second register as a fixed point number to obtain an addition result, wherein the addition result contains a mantissa bit field of U bits and an exponent bit field of L bits, wherein bits in the mantissa bit field are of higher-significance than bits in the exponent bit field; and a bit shifter for extracting the value of the highest-order U bits of the mantissa bit field of the multiplication result, and shifting the extracted bits according to the value of the L bit exponent bit field of the addition result.

3. A floating point arithmetic device for outputting a value obtained by multiplying a real number as a floating point number by a fixed point number, resulting in a floating point number, wherein the floating point number includes a mantissa and an exponent, said floating point arithmetic device comprising:

a first register of N bits, including a high-order bit field of U bits and a low-order bit field of L bits, wherein $N \geq (U+L)$, for storing the floating point number, wherein the high-order bit field is of higher-significance than the low-order bit field, the high-order bit field stores the entire mantissa of the floating point number as a fixed point number, and the low-order bit field stores the entire exponent of the floating point number as an integer;

a second register for storing the fixed point number;

a multiplier for multiplying the entire value of said first register as a fixed point number and the entire value of said second register as a fixed point number to obtain a multiplication result, wherein the multiplication result contains a mantissa bit field of at least U bits and an exponent bit field of at least L bits, wherein bits in the mantissa bit field are of higher-significance than bits in the exponent bit field; and a bit combiner for combining the highest-order U bits of the mantissa bit field of the multiplication result with the exponent of the floating point number stored in the low-order bit field of said first register.

4. A floating point arithmetic device for outputting a value obtained by multiplying a real number as a floating point number by a fixed point number, resulting in a fixed point number, where the floating point number includes a mantissa and an exponent, said floating point arithmetic device comprising:

a first register of N bits, including a high-order bit field of U bits and a low-order bit field of L bits, wherein $N \geq (U+L)$, for storing the floating point number, wherein the high-order bit field is of higher-significance than the low-order bit field, the high-order bit field stores the entire mantissa of the floating point number as a fixed point number, and the low-order bit field stores the entire exponent of the floating point number as an integer;

a second register for storing the fixed point number;

a multiplier for multiplying the entire value of said first register as a fixed point number and the entire value of said second register as a fixed point number to obtain a multiplication result, wherein the multiplication result contains a mantissa bit field of at least U bits and an exponent bit field of at least L bits, wherein bits in the mantissa bit field are of higher significance than bits in the exponent bit field; and a bit shifter for extracting the value of the highest-order U bits of the mantissa bit field of the multiplication result, and shifting the extracted bits according to the value of the exponent of the floating point number stored in the low-order bit field of said first register.

* * * * *